(12) United States Patent
Davutoglu

(10) Patent No.: US 7,072,953 B1
(45) Date of Patent: Jul. 4, 2006

(54) METHOD FOR SETTING UP AND/OR PROCESSING A SERVICE OF AN INTELLIGENT NETWORK

(75) Inventor: Can Davutoglu, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 570 days.

(21) Appl. No.: 09/500,281

(22) Filed: Feb. 8, 2000

Related U.S. Application Data (63) Continuation of application No. PCT/DE98/02062, filed on Jul. 22, 1998.

(30) Foreign Application Priority Data

Aug. 8, 1997 (DE) .......................... 197 34 515

(51) Int. Cl.
*G06F 15/173* (2006.01)

(52) U.S. Cl. .................. 709/223; 709/203; 709/225
(58) Field of Classification Search ................ 709/223, 709/229, 202–203, 224–225, 219, 226
See application file for complete search history.

(56) References Cited

U.S. PATENT DOCUMENTS

| | | | | |
|---|---|---|---|---|
| 5,912,954 A | * | 6/1999 | Whited et al. | 379/115 |
| 5,915,008 A | * | 6/1999 | Dulman | 379/201 |
| 5,958,016 A | * | 9/1999 | Chang et al. | 709/229 |
| 6,031,904 A | * | 2/2000 | An et al. | 379/201 |
| 6,115,737 A | * | 9/2000 | Ely et al. | 709/229 |
| 6,243,451 B1 | * | 6/2001 | Shah et al. | 379/201 |
| 6,282,566 B1 | * | 8/2001 | Lee, Jr. et al. | 709/217 |

OTHER PUBLICATIONS

Omiya et al, "Service Creation and Execution Domain Concept for The Intelligent Netwrk", IEEE, 1991.*
Wuthnow et al, "An Intelligent Network Prototyping Environment for Personal Communications service", IEEE, 1991.*
Maeda et al, "Service Creation Environment for The Intelligent Network", IEEE, 1992.*
Benette et al, "Intelligent Network : The Service Creation Environment", Communication & Transmission, vol. 17, No. 2, Jan. 1, 1995, pp 13–20.*
Nichols et al, "End Customer Control in the Intelligent Network", IEEE, 1996.*

(Continued)

*Primary Examiner*—Philip B. Tran
(74) *Attorney, Agent, or Firm*—Laurence A. Greenberg; Werner H. Stemer; Ralph E. Locher (57) ABSTRACT

A method for producing service data prototypes which are used to describe the data used in a telecommunications service of an intelligent network during the process of setting up and/or processing a service at a service management point is provided. A data format for the prototypes is chosen, such that the data format allows the recording of both text and instruction codes in a text-compatible format, for example as symbolic instructions. The prototypes are equipped with instruction codes which are used for producing service data entities. A method for producing service data entities which contain the data used in a telecommunications service of an intelligent network is also provided. The content of at least one prototype is displayed on the terminal of the service provider and the service provider produces the entities by entering instructions on the terminal and by selecting and running at least one instruction code from the instruction codes of the at least one displayed prototype.

20 Claims, 2 Drawing Sheets

OTHER PUBLICATIONS

Mizuno et al, "Service Specification Description and Service Logic Program Generationfor Intelligent Networks", NTT Communication Switching Laboratories, Tokyo, Japan, 1992.*

Hing Fai (Louis) Chong et al.: "Methodology and Tools for Intelligent Network Service Specification", *Proceedings of the Global Communications Conference (Globecom)*, San Francisco, Nov. 28–Dec. 2, 1994, pp. 1259–1263, XP–000488736.

International Publication No. WO 97/16929 (Waters et al.), dated May 9, 1997.

"Intelligent Network Software Factory for Service Creation and Modification" (Pennanec'h), 1225 Electrical Communication 63, No. 4, 1989, pp. 345–355.

"Design of an Integrated Service Creation Environment for the Advanced Intelligent Network" (Niitsu et al.), IEEE 7803–2509, May 1995, pp. 1277–1281.

"Service Specification Description and Service Logic Program Generation for Intelligent Networks" (Mizuno et al.), NTT Communication Switching Laboratories, Tokyo, Japan, pp. 430–440.

"Service Management in Intelligent Networks" (Cambre), Proceedings of the International Council for Computer Communication Intelligent Networks Conference, May 1992, pp. 420–429.

* cited by examiner

Fig. 1

Fig. 2 SERVICE MANAGEMENT POINT

METHOD FOR SETTING UP AND/OR PROCESSING A SERVICE OF AN INTELLIGENT NETWORK

CROSS-REFERENCE TO RELATED APPLICATION

This is a continuation of copending International application PCT/DE98/02062, filed Jul. 22, 1998, which designated the United States.

BACKGROUND OF THE INVENTION

FIELD OF THE INVENTION

The invention relates to a method for setting up and/or processing a service of an intelligent network. The invention also relates to a method for producing service data prototypes, which are used for describing the data used in a telecommunications service of an intelligent network. The invention furthermore relates to a method for producing service data entities using service data prototypes.

An intelligent network can be used for setting up services which represent a service by the service provider, carried via the telecommunications network, for other subscribers of the intelligent network. These subscribers become service subscribers by using the service. Typical examples of such services include: universal call numbers, such as an emergency telephone number, with which the calling service subscriber is passed onto the responsible emergency call center depending on the caller location; a weather information service, which must be regularly updated and, in some circumstances, may also be broken down regionally, once again with respect to the caller location; or an information service, in which the service subscriber is routed to different offices depending on the nature of the information desired, and this routing is carried out automatically in a dialogue between the subscriber via announcements in the form of questions asked and subscriber responses, for example in the form of dialing signals. In these examples, the service moves in a connection which is set up from the service subscriber end. However, the service subscriber may also be a called subscriber, as in the case of an information service for example, which may for instance pass on electronic mail to the service subscriber, with the service subscriber terminal in this case being a computer with a modem instead of a telephone set.

Unlike the service subscriber, the service provider generally need not be a subscriber of the telecommunications network. This is exemplified by the example of a weather service, which includes only spoken texts and for which the text of the announcements can be transmitted from the service provider, such as a meteorological institute, to the network operator even without using the telecommunications network, for example using an audio medium.

Furthermore, the distinction drawn here between the network operator as the supervisor of the intelligent network, on the one hand, and the service provider as the operator of the service, on the other hand, does not exclude the situation where the service provider himself is the network operator. In fact, a network operator himself may also offer services on the network which he controls. The telecommunications networks referred to here may be of any type, such as for example radio networks such as the GSM network.

In order to provide the services, the intelligent network has one or more service operation stations or service control points (SCP) which all have information and equipment required for the operation of the services and have access to the data of the telecommunications network, such as the call number plan. The access to the service control points, for example for maintenance of services, takes place via service management stations or service management points (SMP), which are normally units that are independent of the service control points. However, in special cases, the functions of the two points may also be carried out by one apparatus. In the context of the invention, the totality of service control points and service management points is referred to as a network control station.

A service on an intelligent network is made available and is preconfigured by the network operator on request by the service provider; after this, the service provider adapts the service for his requirements, but within the options specified by the network operator. If change requests from the service provider go beyond the framework specified by the network operator, the service must be revised or entirely reworked or newly prepared by the network operator.

In special cases, a service subscriber may also adapt a service, instead of the service provider. In cases such as this, the service subscriber is authorized by the service provider, in rare cases by the network operator as well, to adapt the service, with the authorization also specifying the extent to which the respective service subscriber can change the features of a service. The authorization for adaptation by the service subscriber may be given expressly or implicitly, for example by reporting the access facility or access possibility to the network control station to the service subscriber. Where the following text refers to a service adaptation by the service provider, this thus also implicitly always includes the possibility for a service subscriber to adapt the service, instead of the service provider.

For the sake of simplicity, the service data prototypes and the service data entities will be referred to for short as prototypes and entities, respectively, in the following text.

Various tools are available to the network operator and the service provider, respectively, for service management and service adaptation, and these tools are normally in the form of computer programs which run at the data management point or on the service provider terminal. The service functions, prototypes and entities are likewise normally represented as files, which are kept at the service management point. In general, this is also true of the service definitions, where they exist in a concrete form at all, and not just as an imaginary concept.

Previous solutions for setting up telecommunications services proposed that the network operator loads the service definition to the service management point, and there then uses a service compiler to transfer it into a plurality of data objects, including the prototypes. Further control or processing tools are provided for further processing, which allow specific data and parameters associated with the telecommunications service to be selected and to be set. A service management tool is available to the network operator for producing and writing service-user authorizations, for access authorization to data objects and for producing and processing call number plans. A dedicated tool, namely the customer service control (CSC) or service adaptation, which the network operator must make available to the service provider, is used for managing the data to be supplied by the service provider for handling of statistical data by the service provider. The customer service control is operated on a computer by the service provider. This computer is generally independent of the service management point, and normally uses a different computer system. The version of the customer service control which the network operator makes available to the service provider must therefore be adjusted by the network operator to the specific system of the service provider. This customer service control can thus in general not be carried out at the service management point. In order to produce the customer service control, the network operator must himself create an appropriate system environment, which is external to the service management point system. Since the various service providers in general also use different types of computer systems, this results in very stringent requirements for the network operator in terms of system resources and system configuration as well as flexibility. Furthermore, of course, depending on the configuration and complexity of the customer service control operator interface, detailed knowledge of the relevant computer systems is required. In addition, the prototypes and entities have to be interchanged between the service provider's computer and the service management point computer, using data media such as floppy disks, or via a connection, for example through the use of a modem line. Transfers between different systems are always problematic, except for text files. Until now, work has been limited, on the one hand, to a pure text format for the prototypes and entities, and on the other hand, to the customer service control programs which are easy to use. For the service provider, this has resulted in a fragile operator interface for customer service control, with the service data being represented with a lack of clarity, and often incomprehensibly.

SUMMARY OF THE INVENTION

It is accordingly an object of the invention to provide a method for setting up or processing telecommunications services which overcomes the above-mentioned disadvantages of the heretofore-known methods of this general type and which makes it possible in a simple and standard manner to access information characterizing a sequence of services, and to process this information. If possible, this information should in this case also go beyond data kept in text format. A further object of the invention is to simplify the transfer of data between the computer stations involved.

With the foregoing and other objects in view there is provided, in accordance with the invention, a method for setting up and/or processing a service of an intelligent network supervised by a network operator, the intelligent network having an actual telecommunications network, at least one service control point set up for carrying out services of the intelligent network, and at least one service management point assigned to the at least one service control point, the method includes the steps of generating and/or processing a service definition with the network operator, on request of a service provider; converting the service definition at a service management point into service functions and service data prototypes with the network operator, the service functions representing procedures to be carried out by a service, the service data prototypes being used for describing data used by the service functions; choosing a data format allowing a recording of text and instruction codes in a text-compatible format for at least one of the service data prototypes; equipping markup service data prototypes represented in the chosen data format with instruction codes used for producing service data entities; displaying a content of at least one of the markup service data prototypes on a service provider terminal; preparing the service using the service functions and the service data prototypes on an intelligent network, with the network operator; producing at least one of the service data entities from the service provider terminal and via a link set up to the service management point for each of the service data prototypes, with the service provider, the at least one of the service data entities containing the data used by the service functions; producing the at least one of the service data entities with the service provider, via instructions entered at the service provider terminal, by selecting and running at least one of the instruction codes of the at least one of the markup service data prototypes displayed on the service provider terminal; selecting at least one of the service data entities for one of activating and updating the service, with the service provider or a service user; and activating and/or updating the service, with the service provider, using the service functions and the at least one of the service data entities selected the service provider or the service user.

In other words, the objects of the invention are achieved with a method in which:

a) the network operator produces and processes a definition of the service on request from a service provider;

b) the network operator converts this service definition at the service management point into service functions and service data prototypes, in which case the service functions represent the procedures to be carried out by the service and these prototypes are used to describe the data used by the service functions;

c) the network operator prepares the service using the service functions and prototypes on the intelligent network;

d) from a terminal and via a link set up to the service management point to each of the prototypes, the service provider produces at least one service data entity, in which case this entity contains the data used by the service functions;

e) the service provider selects at least one of the entities for activation and/or updating of the service;

f) the service provider activates and/or updates the service using the service functions and the entities selected by the service user;

g) a data format is chosen for a number of prototypes, but at least for one, which allows the recording of both text and instruction codes in a text-compatible format, for example as symbolic instructions;

h) the markup prototypes which are represented in the chosen data format are equipped with instruction codes which are used to produce entities;

i) the content of at least one markup prototype is displayed on the service provider's terminal; and j) the service provider produces the entities, via instructions entered on his terminal, by selecting and running at least one suitable instruction code from the instruction codes of the displayed markup prototypes.

The term adaptation of a service in this case means those activities for processing a service which are carried out by the service provider, while the service-related activities of the network operator are combined within the term service management. For the method steps described above, this means that steps a) to c), that is to say the production and processing of the service definition, the conversion of this definition into service functions and service data prototypes, and the preparation or provision of the service on the telecommunications network are included in the management of the service. On the other hand, steps d) to f), namely the generation or production of the service data entities from the service data prototypes, the selection of service data entities for the activation or updating of the service, and the activation of a new service or the updating of an existing service, make up the adaptation of a service.

This solution has the advantage that, instead of the customer service control program, the service provider can use a simple program, for example a text output connected to an interpreter for the prototype instruction codes. Such programs, which are used, for example, in word-processing systems, are known per se and are available for a wide range of computer systems, but only in the context of processing and providing information from publications or the like. Since the instruction codes of the prototypes are stored in a text-compatible format, already known, simple methods for text data may be used for transferring the prototypes between different computer systems.

In accordance with a preferred mode of the invention, in which the service processing is distinguished by a particular comprehensibility, a graphics structure, which corresponds to the logic structure of the service, is generated during the production and/or processing or conversion of the service definition by the network operator, and is stored in a markup prototype using the text-compatible instruction codes.

In this case, it is also particularly useful and illustrative for the service provider if the graphics structure is displayed on the service provider's terminal during the production or selection of the entities.

In accordance with another mode of the invention, that considerably reduces the complexity for carrying out the method, a service is defined by the network operator selecting a number of predefined service building blocks, and defining the links between these service building blocks and the link to the components of the intelligent network.

In this case, it is advantageous and expedient in practice if functionally related service building blocks are combined to form groups, and if each group is assigned at least one object of the graphics structure.

In accordance with a further mode of the invention, during the production of the entities, the service provider is requested to input data which are used for producing the entities.

In this case, the clarity of the method is improved, particularly for the service provider, if he is requested to enter parameters of service building blocks, and this is done using forms, worksheets or display masks, which are each assigned to one object of the graphics structure and are in each case used for inputting parameters of those service building blocks which are represented by the object corresponding to a form.

It is in this case furthermore advantageous for the service provider to initiate the input request through the use of a specific instruction, for example by selecting an instruction code or by clicking on a graphics element with which an input form (standard from, display mask) is associated.

In accordance with an additional mode of the invention, that is particularly advantageous in practice, a markup language, for example, HTML, is used for the data format of the markup prototypes, and the markup prototype is displayed to the service provider using a browser program which is suitable for the markup language.

A further advantageous mode of the invention has the advantage that the method according to the invention can be carried out from virtually any desired location, as a result of the fact that the connection from the terminal of the service provider to the service management point is produced via a freely accessible computer network.

In accordance with yet a further mode of the invention, that is beneficial to the security of the service management point, the connection from the terminal of the service provider to the service management point is set up via a firewall computer which is associated with the service management point.

In accordance with a further mode of the invention, that is advantageous with regard to data security, the service provider is allowed access to the service management point and/or access to the prototypes only after inputting an authorization, for example a PIN code or a transaction identification number.

In accordance with still a further mode of the invention that is advantageous with regard to reducing the expense and complexity of the method, the network operator uses a definition tool of the service management point for producing and/or processing the service definition.

For reducing the expense or complexity of the method, it is likewise advantageous if the network operator uses a compiler tool of the service management point for converting the service definition.

Furthermore, the method is simplified by the advantageous mode of the invention according to which the network operator prepares the service on the telecommunications network using a management tool.

Another advantageous mode of the invention, which simplifies the flexible handling of the services, allows that the production of the entities and/or the selection of the entities and/or the activation or updating of the service is carried out by a service subscriber, who has been authorized to do so by the service provider and/or the network operator.

With the objects of the invention in view there is also provided, a method for producing service data prototypes used for describing data used in a telecommunications service of an intelligent network, the method includes the steps of choosing a data format allowing a recording of text and instruction codes in a text-compatible format and using the data format for service data prototypes; and equipping the service data prototypes with the instruction codes used for producing service data entities, the service data entities containing data used in a telecommunications service of an intelligent network.

With the objects of the invention in view there is further provided, a method for producing service data entities, which includes the steps of producing service data prototypes used for describing data used in a telecommunications service of an intelligent network by choosing a data format allowing a recording of text and instruction codes in a text-compatible format and using the data format for the service data prototypes; equipping the service data prototypes with the instruction codes used for producing service data entities by a user, the service data entities containing data used in a telecommunications service of an intelligent network; displaying a content of at least one of the service data prototypes on a user terminal; and producing the service data entities, via instructions entered on the user terminal, by selecting and running at least one of the instruction codes of the at least one of the service data prototypes displayed on the user terminal.

In other words, the objects described above are furthermore achieved by a method for producing service data prototypes using a method of the type described above in which, according to the invention, a data format is chosen for the prototypes which allows the recording of both text and instruction codes in a text-compatible format, for example as symbolic instructions, and the prototypes are equipped with instruction codes which are used for producing service data entities, wherein the entities contain the data used in a telecommunications service of an intelligent network.

This solution has also the advantage that the service provider can use a simple and less-specific program, for example a text output connected to an interpreter for the prototype instruction codes, instead of the customer service control program. Prototypes equipped with instruction codes can now carry out the tasks of the customer service control program, which reduces the effort on the part of the service provider and the network operator.

In accordance with a preferred mode of the invention, which is distinguished by a particular comprehensibility and clarity of the service processing, a graphics structure which corresponds to the logic structure of the service is produced and is stored in a prototype using text-compatible instruction codes.

In accordance with an advantageous mode of the invention, the effort required to carry out the method is considerably reduced in that a service is defined by selecting a number of predefined service building blocks and by defining the links between these service building blocks and the link to the components of the intelligent network, functionally associated service building blocks are combined to form groups, and each group is assigned at least one object of the graphics structure.

In accordance with another mode of the invention, which is particularly advantageous in practice, a markup language, for example HTML, is used for the data format of the prototypes.

In accordance with a further mode of the invention, which is distinguished by an easy operability by the user, that is to say the service provider and/or subscriber, the service data entities are produced using the above service data prototypes in that the content of at least one prototype is displayed on the user's terminal, and the user produces the entities, via instructions entered on his terminal, by selecting and running at least one suitable instruction code from the instruction codes of the at least one displayed prototype.

In this case, it is furthermore particularly useful for the user if the graphics structure which is stored in the prototypes is displayed on a user terminal.

In accordance with an advantageous mode of the invention, the user is requested to input data which are used for producing the entities.

In this case, clarity for the user is improved if he is requested to input parameters of service building blocks, and this is done using forms which are each assigned to one object of the graphics structure and are in each case used for inputting parameters of those service building blocks which are represented by the object corresponding to a form.

In this case, it is furthermore advantageous if the user initiates the input request through the use of a specific instruction, for example by selecting an instruction code or by clicking on a graphics element with which an input form is associated.

In accordance with a further mode of the invention, which is particularly advantageous in practice, the prototype is displayed to the user using a browser program which is suitable for the markup language.

In accordance with another advantageous mode of the invention, in which the production of entities can be carried out from virtually any desired location, the user does this from a terminal which is connected to the service management point of the intelligent network via a freely accessible computer network.

In accordance with yet another mode of the invention, which is advantageous in view of the security of the service management point, the connection from the user's terminal to the service management point is set up via a firewall computer which is associated with the service management point.

It is likewise advantageous for data security if the user is allowed access to the service management point and access to the prototypes only after inputting an authorization, for example a PIN code or a transaction identification number. Other features which are considered as characteristic for the invention are set forth in the appended claims.

Although the invention is illustrated and described herein as embodied in a method for setting up and/or processing a service of an intelligent network and a method for producing service data prototypes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
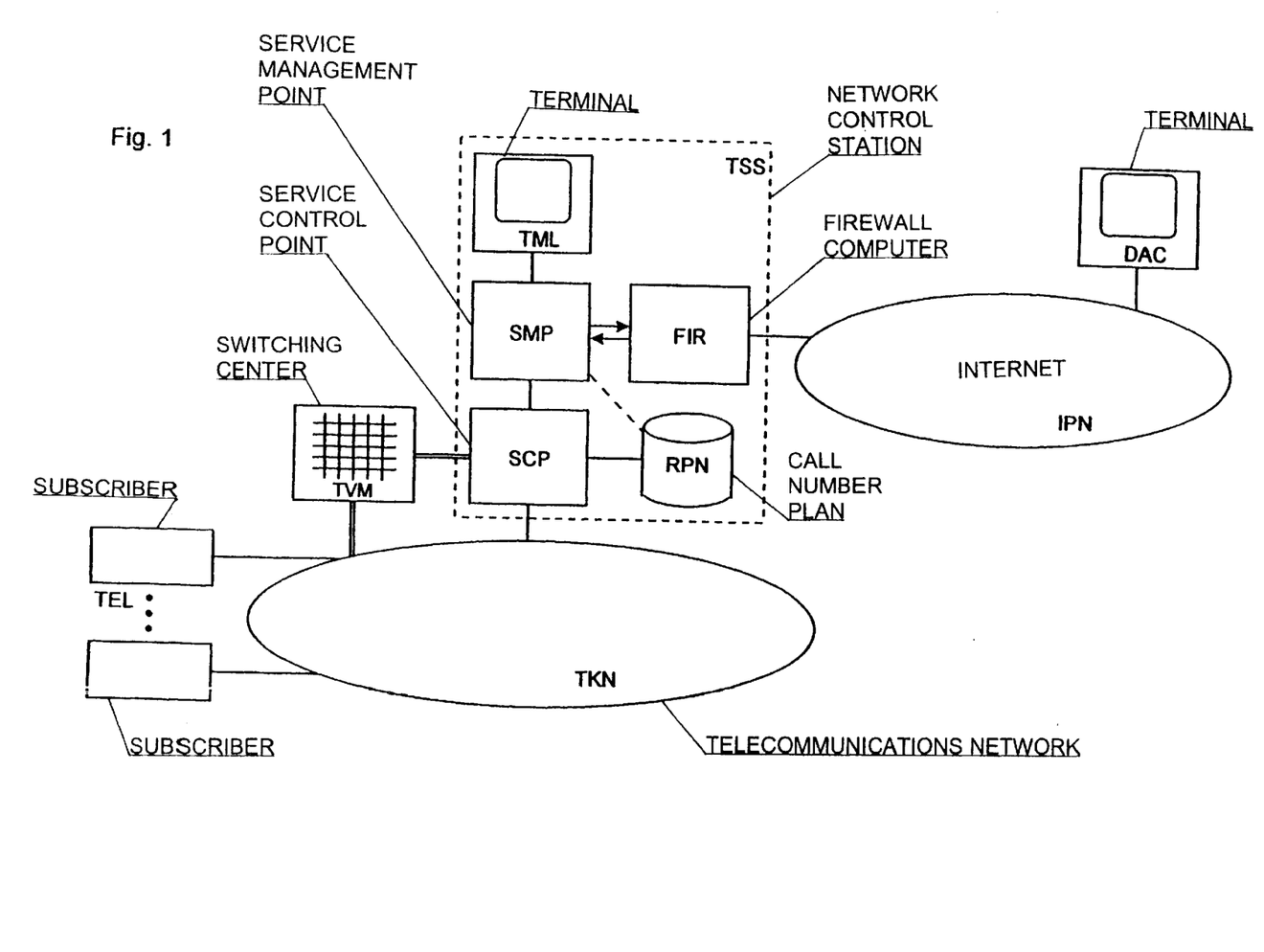
FIG. 1 is a schematic overview of the basic configuration of the intelligent network.

Referring now to the figures of the drawings in detail and first, particularly, to FIG. 1 thereof, there is shown an intelligent telecommunications network which includes the actual telecommunications network TKN, to which a plurality of subscribers TEL are connected, as well as the switching center TVM for the telecommunications network and the network control station TSS for the services of the intelligent telecommunications network. In other implementations of an intelligent network, a plurality of switching centers may also be provided. The network control station TSS may also be distributed in a decentralized manner between a plurality of locations. The network control station TSS includes the service control point SCP, the service management point SMP as well as a variety of equipment which acts as peripherals for the service management point. The latter include, in particular, at least one terminal TML, which provides the network operator with access to the service management point SMP for data management purposes, databanks such as the call number plan RPN, which the switching center TVM also accesses directly or indirectly via the service control point, as well as a firewall computer FIR, which acts as a connection point between the network control station TSS and the Internet IPN.

The firewall computer FIR is used to protect the service management point SMP against unauthorized accesses from the Internet. Firewall computers or "firewalls" are a known concept for protection of computer networks. In this case, the firewall computer carries out all the functions of an Internet server for adaptation of services, and thus relieves the actual service management point SMP of the load of these tasks. If a service provider wishes to adapt one of his services, he logs on with the network control station TSS via the firewall computer FIR, and the prototypes and entities are processed, for example, according to the client-server principle between the firewall computer FIR and the service provider's terminal DAC, which is typically a PC with Internet software. The firewall computer FIR receives the service-related files from the service management point SMP and supplies, if required, modified versions of such data back to the service management point. However, the data traffic between these computers is limited to these files. When the service provider is adapting services from his terminal computer DAC that is connected to the Internet, the firewall computer FIR is, of course, transparent to him and he can thus see no difference between carrying out the adaptation directly at the service management point SMP and carrying it out via a firewall computer.

The invention allows data which originate from a closed control system for telecommunications services to be made accessible via an external medium. By virtue of the link to an existing computer network such as the Internet, the service provider gains access for adaptation of the service from any desired computer location which is connected to this computer network. In the case of the Internet, for example, this means a worldwide access capability.

Figure 2:
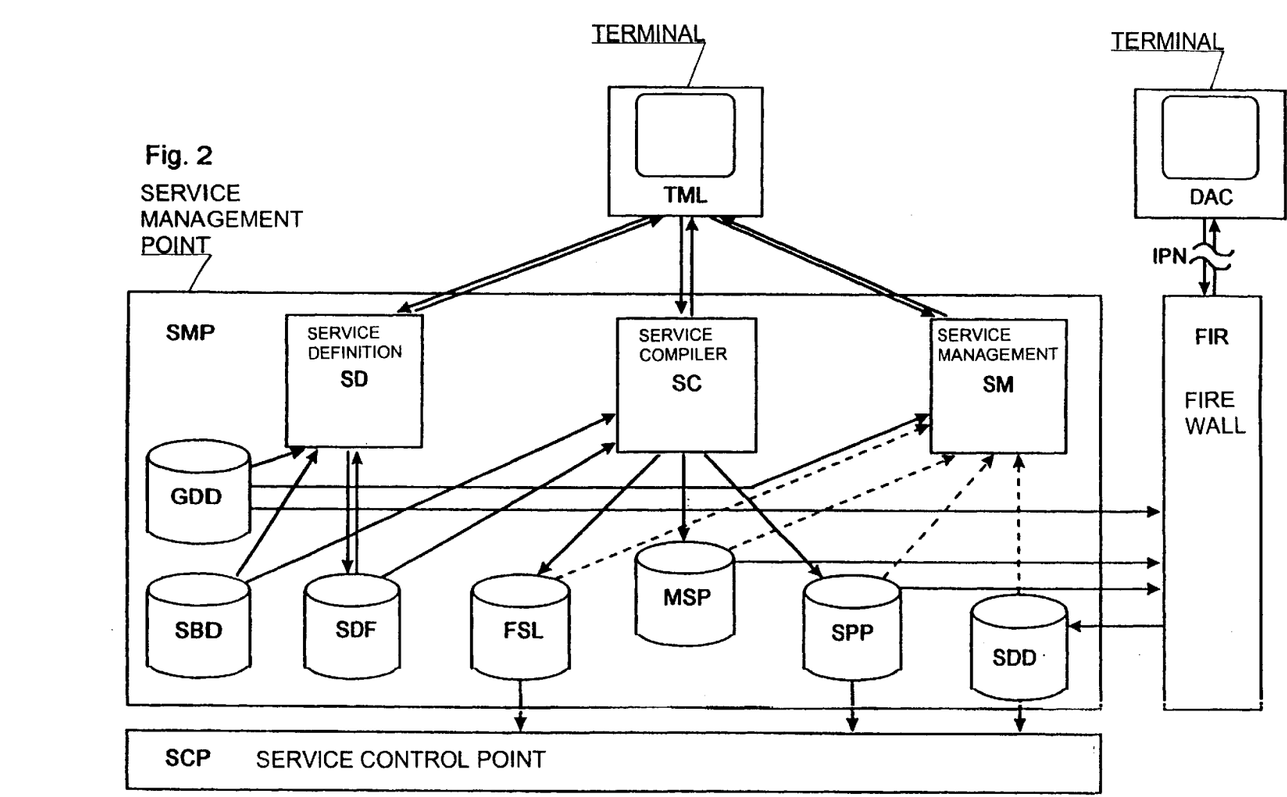
FIG. 2 is a schematic block diagram of the components of the network control station with the data objects associated with the service management point.

The components, applications and files of the network control station TSS are illustrated in FIG. 2, to the extent that they are relevant to the invention. In order to define a service, the network operator uses a definition tool SD ("service definition") at the service management point, through the use of which he communicates via a terminal TML of the service management point SMP. Furthermore, a set of service building blocks are available to him, which are referred to as SIBs ("system independent building blocks") and carry out elementary service sequence tasks, such as outputting a text announcement or checking the present time, as well as "global" data of a general nature, such as standard announcements or tariff plans. The service building blocks and the global data are stored in dedicated data banks SBD and GDD at the service management point. The network operator now selects the service building blocks which are in each case required for the service and configures them with respect to one another in the manner of a flowchart. In this case, branches may also be programmed, namely through the use of appropriate branching SIBS, which can be made dependent on various parameters, such as the caller location or the dialing code of the caller, or inputs to be made by the caller. This configuration of service building blocks in the form of a sequence forms the service definition which, if required, can be stored as an individual or dedicated data object SDF.

The service definition is of a symbolic nature, comparable to an algorithm or a program in a relatively high-level programming language. Furthermore, the service building blocks of the service definition in general contain parameters which can be adapted by the service provider and are left free or are preconfigured by the network operator, for example information text. For these reasons, the service definition cannot be used directly for carrying out the service. Instead of this, the service definition SDF is transferred to a compiler tool SC ("service compiler") at the service management point SMP, and is converted by this compiler tool SC into service functions FSL and service data prototypes SPP, referred to as prototypes for short. The service functions FSL ("flexible service logic") contain the service sequences in procedural form, but also require the data to be supplied by the service provider, the type and format of which are defined in the prototypes. The network operator can, of course, prepare the service on the telecommunications network even at this time. This includes the processing of the call number plans, for example setting up a universal call number, and the production and description of service-user authorizations. The network operator does this using the management tool SM ("service management") with the assistance of the described data objects at the service management point SMP. In some circumstances, the service may be already be activated as a provisional version, using preconfigured data.

The service data to be adapted by the service provider must now be supplied by the service provider. This is done in the form of service data entities SDD, referred to as entities for short. The type and format of the data contained in an entity are defined by the basic prototype SPP, in a comparable manner to a formal text, whose configuration is defined by a form.

In the example of service adaptation on an intelligent telecommunications network, the service provider is shown a symbolic representation of the service sequence. Since the service definition in general contains more information than can be set or adjusted by the service provider during adaptation of the service, but which is also normally of interest for him, the invention provides for the service provider to be presented with a simplified, graphics representation. This graphics presentation or graphical representation of the service sequence is produced by the network operator, using the definition tool SD, during the production of the service definition. As an alternative to this, it is also feasible for the graphics presentation to be produced only during the conversion into the prototypes. To do this, the network operator in each case combines functionally associated service building blocks to form a group, and for this purpose produces a graphics object, which represents this group in the graphics representation. A graphics object is also assigned a set of parameters to be adapted by the service provider, to be precise the parameters for those service building blocks which belong to the service building block group represented by the object. Each graphics object also includes one or more forms, via which the service data associated with the object are input. The graphics representation is stored together with the other data formats during the conversion of the data definition, by the service compiler SD, in dedicated markup prototypes MSP, which are produced in addition to the service prototypes SPP and via which the graphics representation is accessible to the service provider during adaptation of the service. It would, of course, also be possible for the information in the markup prototypes MSP to be stored directly in the prototypes SPP; however, this is not advisable in practice owing to the amount of data to be handled. Normally, each service prototype SPP is assigned a markup prototype MSP; however, this assignment need not be unique since, in particular cases, one markup prototype MSP may also be assigned a plurality of service prototypes SPP, or vice versa.

In individual cases, it is also possible for the service building block groups to overlap, so that one service building block is represented in more than one graphics object. More often, a plurality of objects are assigned to one service building block group, for example for reasons relating to the clarity of the graphics structure. A service building block group may, of course, also include only one service building block. In special cases, a group may be empty, for example if there is nothing to do in one sequence path for a particular service. Parts of the service sequence, which are irrelevant to the service provider, may also be omitted from the graphics representation. These special cases are particularly important for the standard configuration of service families or if a plurality of markup prototypes are associated with one service.

In order to allow the recording of text, on the one hand, and graphics information, on the other hand, the markup prototypes MSP are written as HTML documents. HTML ("hypertext markup language") is a text language that is in widespread use on the Internet, particularly on the Worldwide Web, and is based on the "standard generalized markup language" defined in the ISO 8879 Standard, and in which details are described relating to the formatting of text, text styles, cross-references, etc. and so-called markups. Markups are instructions in text form which can be identified as instructions by specific features, for example an escape symbol. These markups are converted by a markup text interpreter or compiler into the appropriate features of the rest of the text. In the case of the Internet, the text interpreter through the use of which an HTML document can be displayed on a screen or can be printed out is referred to as a browser. Graphics can be implemented in various ways in HTML documents, for example by embedding an HTML-independent image, by construction using graphics markups, by composition and configuration of elements to form a graphic, or by combination of these methods.

Markups may also include instructions which can be carried out interactively in the form of a reaction from the HTML browser or server and are activated through the use of a specific instruction from the user—in this case the service provider. They are activated, for example, by using the mouse to click on the screen. So-called links are of particular importance in HTML texts. These are markups which generally appear as keywords occurring in normal text and can be identified by the service provider as links by, for example, being highlighted by using a specific color; in fact, they represent cross-references to other points in the same document, or to other HTML documents. By activating a link, the text point to which the link refers is indicated, wherein a change to another HTML document can be made if necessary.

For adaptation of a service, the service provider uses his terminal DAC and the browser running on the terminal to log on with the network control station TSS via the Internet. The service provider must now authorize himself first of all, in order to be able to access the service data objects. This is done, for example, by entering a PIN number or a transaction identification. All the service adaptation procedures which now follow are carried out using HTML documents, with the service provider giving his instructions by activating markups or on request via a markup by entering instructions. At the start of the service adaptation process, a summary list is displayed to the service provider of those services to which the service provider has access on the basis of the authorization entered by him, as well as the associated prototypes and any already existing entities. The entries in this list represent links to the respective prototypes. The service provider now selects the service and the prototype which he wishes to adapt, by activating the appropriate entry, after which the prototype selected in this way is displayed using the markup prototypes MSP. Depending on their size, the markup prototypes MSP are in the form of dedicated HTML documents or sections of a larger document, for example of the appropriately extended service summary list.

A service prototype SPP selected by the service provider is now represented using the graphics representation in the markup prototypes MSP. In order to adapt the service data, the service provider in each case activates a graphics object, after which the forms associated with the graphics object appear successively, and the service provider enters the service data or edits already existing data. Once the service provider has changed the data in a service prototype to a form that is satisfactory to him, he ends the adaptation process, for example by activating a "button", which is, of course, also a markup, after which the markup prototype produces an entity with the entered data on the network control station TSS. In this case, it should be noted that the prototypes are not themselves changed by the service provider during the process of adapting the service, but are used only as a basis and instrument for producing entities. The service provider uses another "button" to leave the prototypes SPP/MSP, and to return to the service summary list.

Normally, the entity which has just been produced for the first time is regarded as the current version, which is intended to be considered when the service is next updated. However, if the service provider wishes to return to an already existing entity, for example in order to return to a previous information text, then this is done by selecting this entity in the service summary list. In an extension to the invention, the service provider can also change existing entities by selecting the entity to be changed and then activating it, after which an adaptation process is started for this entity. If desired by the service provider, associated prototypes may also be called up and the data from the entity may be used as presettings, which can now be changed as required by the service provider. At the end of the adaptation process, the entity is either overwritten by the new version or remains in existence alongside the new version, depending on the instruction from the service provider.

After completion of the service adaptation tasks, the service provider initiates the activation or, if the service already exists, the updating of the service, for example through the use of an appropriate "button". The service activation or updating is done by transferring to the service control point SCP those entities SDD in the network control station which have been identified by the service provider as the current versions, and linking them to the service functions FSL. Depending on the configuration of the network control station TSS, this final step is carried out automatically and is initiated by the presence of new entity versions, or is initiated explicitly by the service provider. The service provider also has the option, of course, of canceling the service adaptation by using a "cancel button". Finally, the service provider also leaves the service summary list, as a result of which the connection between the network control station TSS and the service provider terminal DAC is cleared.

Finally, it should be noted that the exemplary embodiments described above do not represent the only possible configurations of the present invention. In fact, the present invention relates to all configurations which can be implemented by a person skilled in the art in view of the features defined in the claims.

I claim:

1. A method for at least one of setting up and processing a service of an intelligent network supervised by a network operator, the intelligent network having an actual telecommunications network, at least one service control point set up for carrying out services of the intelligent network, and at least one service management point assigned to the at least one service control point, the method which comprises:

at least one of generating and processing a service definition with a network operator, on request of a service provider;

converting the service definition at a service management point into service functions and service data prototypes with the network operator, the service functions representing procedures to be carried out by a service, the service data prototypes being used for describing data used by the service functions;

choosing a data format allowing a recording of text and instruction codes in a text-compatible format for at least one of the service data prototypes;

equipping markup service data prototypes represented in the chosen data format with instruction codes used for producing service data entities;

displaying a content of at least one of the markup service data prototypes on a service provider terminal;

preparing the service using the service functions and the service data prototypes on an intelligent network, with the network operator;

producing at least one of the service data entities from the service provider terminal and via a link set up to the service management point for each of the service data prototypes, with the service provider, the at least one of the service data entities containing the data used by the service functions;

producing the at least one of the service data entities with the service provider, via instructions entered at the service provider terminal, by selecting and running at least one of the instruction codes of the at least one of the markup service data prototypes displayed on the service provider terminal;

selecting at least one of the service data entities for one of activating and updating the service, with one of the service provider and a service user; and one of activating and updating the service, with the service provider, using the service functions and the at least one of the service data entities selected by one of the service provider and the service user.

2. The method according to claim 1, which comprises using symbolic instructions for the data format allowing the recording of text and instruction codes in the text-compatible format.

3. The method according to claim 1, which comprises:

producing a graphics structure, corresponding to a logic structure of the service, during one of the steps of generating, processing and converting the service definition by the network operator; and storing the graphics structure in one of the markup service data prototypes using the instruction codes in the text-compatible format.

4. The method according to claim 3, which comprises displaying the graphics structure on the service provider terminal during one of the steps of producing and selecting at least one of the service data entities.

5. The method according to claim 1, which comprises defining a service by selecting a number of predefined service building blocks and by defining links between the service building blocks and to components of the intelligent network with the network operator.

6. The method according to claim 3, which comprises:

combining functionally related service building blocks for forming groups; and assigning each of the groups at least one object of the graphics structure.

7. The method according to claim 1, which comprises prompting the service provider to input data used for producing the service data entities, during the step of producing the service data entities.

8. The method according to claim 3, which comprises prompting the service provider to enter parameters of service building blocks by using forms, each of the forms assigned to an object of the graphics structure and used for inputting the parameters of the service building blocks represented by the object corresponding to one of the forms.

9. The method according to claim 7, which comprises initiating an input request by the service provider by using a specific instruction.

10. The method according to claim 9, wherein the step of initiating the input request includes one of clicking on a graphics element associated with an input form and selecting one of the instruction codes.

11. The method according to claim 1, which comprises:

using a markup language for the data format of the markup service data prototypes; and displaying at least one of the markup service data prototypes to the service provider using a browser program suitable for the markup language.

12. The method according to claim 11, which comprises using HTML as the markup language.

13. The method according to claim 1, which comprises setting up a connection from the service provider terminal to the service management point via a freely accessible computer network.

14. The method according to claim 1, which comprises setting up a connection from the service provider terminal to the service management point via a firewall computer associated with the service management point.

15. The method according to claim 1, which comprises authorizing the service provider to access one of the service management point and the service data prototypes only after inputting an authorization.

16. The method according to claim 15, wherein the step of inputting the authorization includes inputting one of a PIN code and a transaction identification number.

17. The method according to claim 1, which comprises using a definition tool at the service management point for one of generating and processing the service definition with the network operator.

18. The method according to claim 1, which comprises using a compiler tool at the service management point for converting the service definition with the network operator.

19. The method according to claim 1, which comprises preparing, with the network operator, the service on a telecommunications network by using a management tool.

20. The method according to claim 1, wherein at least one of the steps of producing at least one of the service data entities, selecting at least one of the service data entities, and one of activating and updating the service is carried out by a service subscriber authorized by one of the service provider and the network operator.

* * * * *